United States Patent [19]

Taylor

[11] 4,015,337
[45] Apr. 5, 1977

[54] COMBINED TAPE MEASURE AND MARKING DEVICE

[76] Inventor: James A. Taylor, 12721 Harbor Blvd., Garden Grove, Calif. 92640

[22] Filed: June 7, 1976

[21] Appl. No.: 693,300

[52] U.S. Cl. .................................. 33/138; 33/27 C; 33/189
[51] Int. Cl.² ........................ G01B 3/10; B43L 9/04
[58] Field of Search .................... 33/138, 189, 27 C

[56] References Cited

UNITED STATES PATENTS

| 2,807,886 | 10/1957 | Aciego | 33/138 |
|---|---|---|---|
| 3,148,455 | 9/1964 | Aciego | 33/138 |
| 3,479,742 | 11/1969 | Starkenberg | 33/138 |
| 3,731,389 | 5/1973 | King | 33/138 |
| 3,802,083 | 4/1974 | Freed | 33/138 |

Primary Examiner—Steven L. Stephan
Attorney, Agent, or Firm—William C. Babcock

[57] ABSTRACT

A combined tape measure and marking device that includes a housing in which a spool is rotatably supported and on which an elongate tape is wound, which tape has measuring graduations extending the length thereof. A spring-loaded arm is pivotally supported from one side of the housing. The arm, on the forward end thereof, supports an alignment arrow and marking device, which alignment arrow may be transversely aligned with a desired graduation on the tape, when the free end of the tape is held at a fixed position on the material or article to be measured.

The pivotally supported arm adjacent the arrow supports a manually operable marking device, with the device being actuated manually after the alignment arrow is aligned with the desired graduation, and the actuation resulting in a mark being placed on the article or material being measured. When the arm is released, the arm automatically assumes a second position where the marking device is out of contact with the article that has been measured. Release of the arm also causes the marking quill to retract to a concealed position where it will not further inadvertently mark the article or material being measured. The spool is preferably spring-loaded to automatically retract the tape into the housing after the measuring operation is completed. However, if desired, manually operable crank means may be provided on the housing to retract the tape after completion of the measuring operation.

5 Claims, 8 Drawing Figures

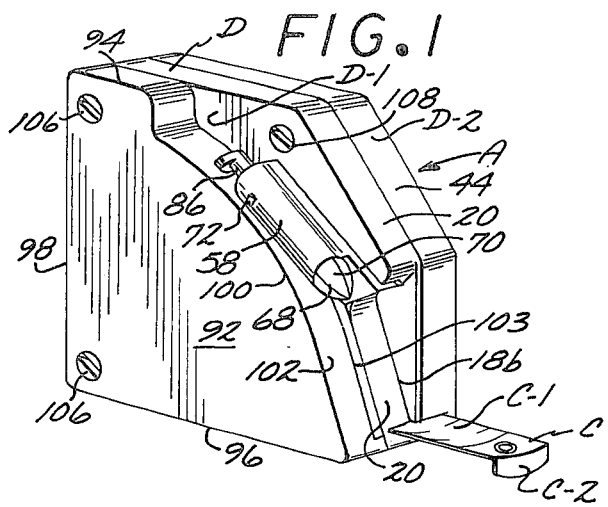
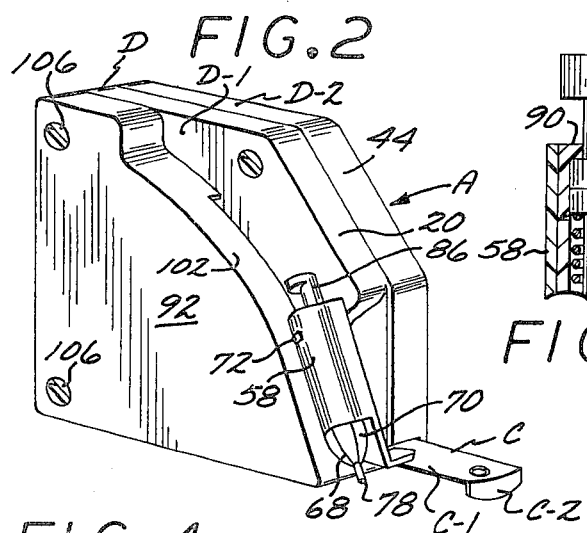
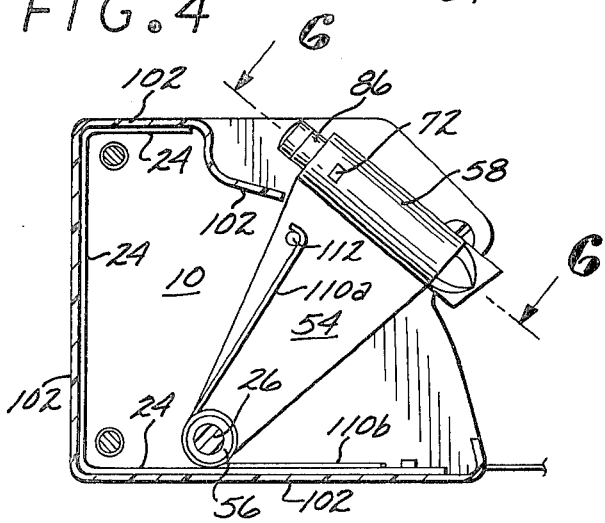
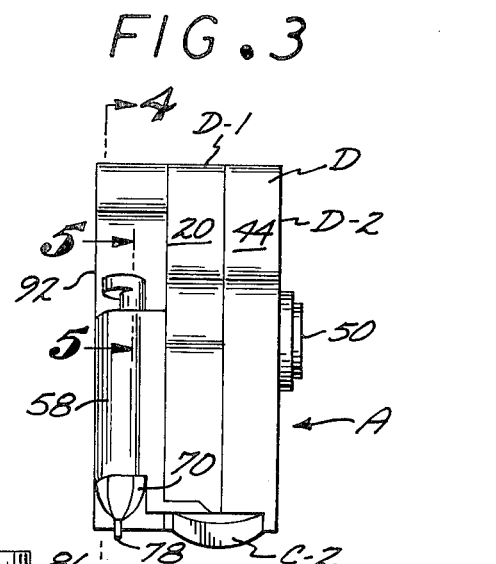
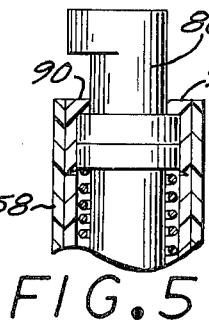
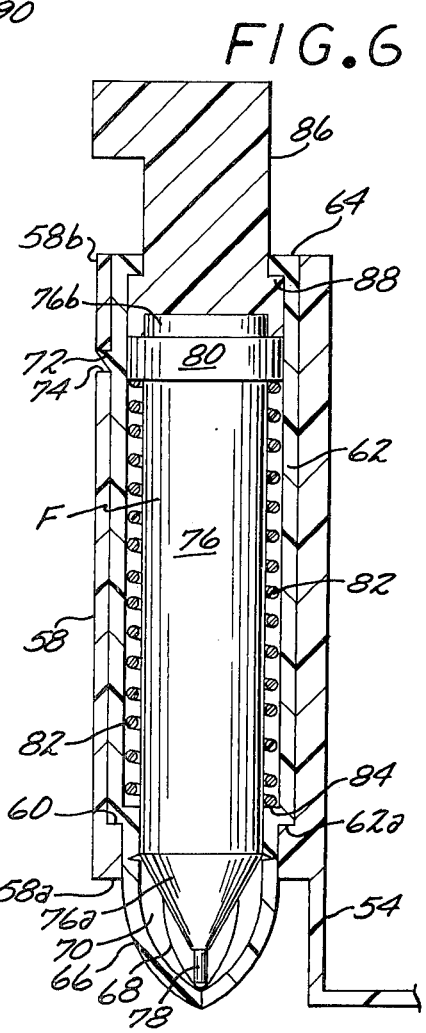

COMBINED TAPE MEASURE AND MARKING DEVICE

BACKGROUND OF THE INVENTION

1. Field of the Invention

Combined tape measure and marking device.

2. Description of the Prior Art

Heretofore it has been common practice for a tape measure to be wound on a spool, with the spool being rotatably supported within the confines of a housing. In using such a tape measure, the free end of the tape is held in a fixed position relative to the article or material to be measured, with the housing then being moved away to unreel tape therefrom. When sufficient tape has been unwound from the housing, a graduation on the tape is in alignment with that portion of the article or material to be measured, with the housing being lowered to rest on the article or material while the tape is held in a fixed position thereon. A separate pencil or other marking device is then used to indicate the measured distance on the article or material.

This is a cumbersome operation, and one that occasionally results in error due to the number of steps involved in measuring and marking a desired length on an article or other material.

The purpose of the present invention is to supply a combined tape measure and marking device in which the device is held in one hand, with the other hand holding the free end of the tape at a desired location on the article or material to be measured, and the device being moved away from the fixed free end. When the device has a graduation in alignment with a desired portion of the article or material, a pivotally supported on the device is pivoted from a second to a first position where an arrow on the arm is placed in precise alignment with the graduation that indicates the measurement and thereafter, a marking device on the arm is actuated to form a mark on the article or material that is in precise transverse alignment with the arrow. Upon completion of the measuring operation, the free end of the tape is released, and the tape retracted into the housing either by spring means or by manual rotation of the spool to accomplish this result.

Concurrently with termination of the measuring operation, the arm is released and automatically pivots from a first to a second position, and as it so does, the marking quill that resulted in the mark on the article or material is automatically retracted to a concealed position, where it will not inadvertently further mark the article or material being measured.

A primary object of the present invention is to provide a combined tape measure and marking device that has a simple mechanical structure, is easy to use, can be fabricated from standard commercially available materials, and due to the simplicity thereof may be retailed at a sufficiently low price as to encourage the widespread use thereof.

A further object of the invention is to supply a combined tape measure and marking device that permits measuring operations to be carried out with greater rapidity than with previously available devices of the same nature, and with human errors resulting from measuring being substantially eliminated due to the manner in which the measuring device is used to both measure and mark an article or other products such as sheet materials.

SUMMARY OF THE INVENTION

The present invention includes an elongate graduated tape that is wound on a spool that is rotatably supported within the interior of a housing, with the housing in addition to providing this function, serving to pivotally support an arm adjacent thereto, which arm is spring-loaded and normally tends to move from a first position to a second position. The forward end of the arm supports a transversely aligned arrow that may be aligned with a desired graduation on the tape when the latter is withdrawn from the housing. The forward end of the arm also supports a manually operable marking assembly, with the assembly when actuated, making a mark that is transversely aligned with the alignment arrow. After the measuring operation is completed, the tape is retracted into the housing either by spring or manually operable means.

Upon termination of the measuring operation the arm is released, and due to the spring-loading thereon, immediately returns to a second position. As the arm returns to the second position, the quill of the marking device assumes a retracted position in which it cannot further mark the article or material being measured. The combined tape measure and marking device is light in weight, compact, and may easily be carried in a pocket from place to place for use as the occasion demands. The combined tape measure and marking device are of such structure that the major components thereof may be injection molded from a suitable plastic material, such a polypropylene or polycarbonate.

BRIEF DESCRIPTION OF THE DRAWINGS

FIG. 1 is a perspective view of the combined tape measure and marking device, with the marking device in a second position adjacent the housing;

FIG. 2 is the same view as shown in FIG. 1, but with the marking device having been manually moved from a second to a first position, and with the marking quill exposed to permit a mark to be made opposite a desired graduation on the tape;

FIG. 3 is an end elevational view of the device shown in FIG. 2;

FIG. 4 is a longitudinal cross-sectional view of a portion of the device, taken on the line 4—4 of FIG. 3;

FIG. 5 is a fragmentary longitudinal cross-sectional view of the upper portion of the marking device;

FIG. 6 is a longitudinal cross-sectional view of the marking device, taken on the line 6—6 of FIG. 4, with the marking quill being in a retracted position;

DESCRIPTION OF THE PREFERRED EMBODIMENT

Figure 7:
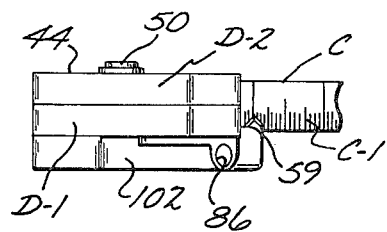
FIG. 7 is a top plan view of the device, with the alignment arrow and marking quill transversely aligned with a desired graduation on the tape.
Figure 8:
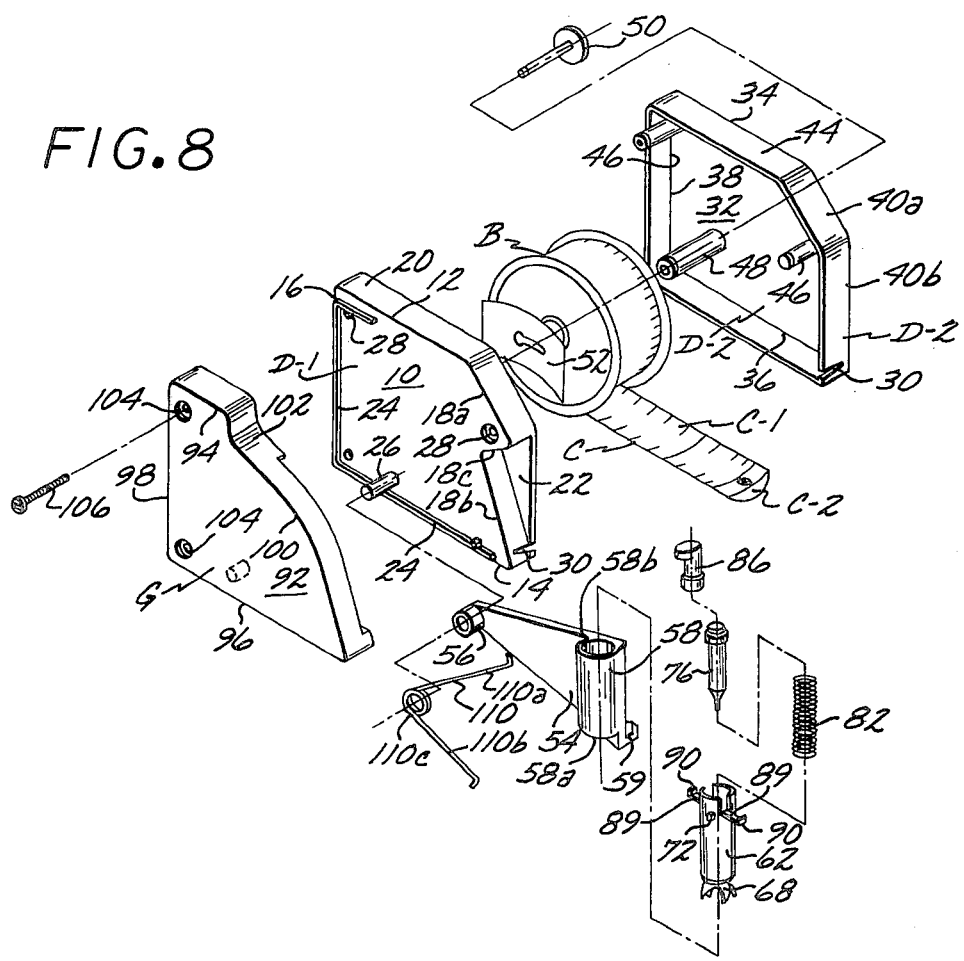
FIG. 8 is an exploded perspective view of the components defining the combined tape measure and marking device.

The combined tape measure and marking device A, as may be seen in FIGS. 1, 2 and 8, includes a spool B on which an elongate tape C is would, with the tape having a number of longitudinally spaced measuring graduations C-1 thereon, with the free end of the tape being provided with a stop C-2. The spool B is rotatably supported in a housing D, which housing, as may be seen in FIG. 7, includes a first housing portion D-1 and second housing portion D-2.

The first housing portion D-1, as shown in FIG. 8, includes a first flat side wall 10 that has a top edge 12 and bottom edge 14. The side wall 10 has a straight rear edge 16 and a forward edge defined by a downwardly and forwardly extending upper portion 18a, an upwardly and rearwardly extending lower portion 18b, and intermediate portion 18c that extends upwardly and forwardly.

A first continuous flange 20 extends outwardly from the edges and edge portions of the first side wall 10 above described. A flat web 22 extends between the free edges of the lower edge portion 18b and intermediate edge portion 18c, as best seen in FIG. 7. The part of the flange 20 adjacent the intersection of lower edge 14 and lower forward edge 18b has a transverse slit 30 formed therein, the function of which slit will later be explained.

The second housing portion D-2, as best seen in FIG. 7, includes a second side wall 32 having a top edge 34, bottom edge 36 and rear straight edge 38. The forward edge of the second side wall includes a downwardly and forwardly extending upper edge portion 40a and a lower edge portion 40b that is normally disposed relative to the lower edge 36. A second continuous flange 44 extends outwardly from the edges above described, with the second flange having a slit 30 formed therein that is transversely aligned with the slit 30 in the first housing portion D-1 when the housing portions are in abutting contact, as shown in FIGS. 1, 2 and 7. The second side wall D-2 has first, second and third spaced elongate tubular bosses 46 projecting therefrom in the same direction as the second flange 44, with the bosses being of tubular construction and preferably having threads formed on the interior thereof.

A tubular shaft 48 also projects from the second side wall 32 in the same direction as the continuous flange 44. The shaft 48 has a fast return button 50, movably supported therein, which when actuated, controls a fast return spring 52 to cause the spring-loaded spool B to retract the tape C into the confines of the housing defined by two portions D-1 and D-2.

In FIG. 7 it will be seen that a triangular arm 54 is provided, on the first end of which a tubular bearing 56 is supported that pivotally engages the stub shaft 26. The forward second end of arm 56 supports a first tube 58 that has a first lower open end 58a and a second upper open end 58b. That end of the arm 54 on which the first tube 58 is mounted also supports a transverse alignment arrow 59 that is adapted to be transversely aligned with a graduation C-1 on the tape C, as shown in FIG. 7. The first tube 58 has a transverse abutment 60 formed within the interior thereof adjacent the first end 58a.

The first tube 58 supports a second tube 62 having a first open end 64 and a second conical closed end 66 in which circumferentially spaced, longitudinally extending slits 68 are defined. The slits serve to divide the second end portion 66 into a number of resilient leaves 70. The second tube 62 has a protuberance 72 formed thereon, as can be seen in FIG. 6, that interlock with an aperture 74 formed in the first tube 58, with the protuberance serving to hold the second tube 62 within the confines of the first tube 58. The second tube 62 has a recessed portion 62a that is in engagement with the abutment 60, as may be seen in FIG. 6.

The marking quill assembly F of the present invention includes the second tube 62 above described, as well as a cylindrical ink-holding body 76 which has a tapered lower end portion 76a from which a felt marking tip 78 projects. A collar 80 is mounted on the body 76 adjacent a second upper end portion 76b thereof, or is formed as a part thereof. A compressed helical spring 82 is provided that encircles the body 76, with one end of the spring being in contact with an interior abutment 84 formed in the second tube 62, with the other end of the spring being in abutting contact with the collar 80.

A button 86 is provided that extends downwardly into the second tube 62 and is in engagement with the second end 76b of the body 76. The button 86 has a body shoulder 88 defined thereon. The second tube 62 is formed from a polymerized resin, and has two oppositely disposed legs 89 thereon that may be bent to longitudinal positions. When legs 89 are so bent, lugs 90 on the ends thereof act as stops by contacting body shoulder 88 to prevent spring 82 from forcing button 86 out of second tube 62.

A plate assembly G is provided that is best seen in FIG. 8, and includes a wall 92 having a top edge 98 and a compound curved forward edge 100, with a third flange 102 being provided that extends outwardly from the edge portions of the wall 92 above described. The third flange 102 has an elongate recess 102a formed therein, which when the plate assembly G occupies the position shown in FIGS. 1 and 2, cooperates with the first side wall 10 to define an elongate slot 103 of sufficient length to permit the arm 54 that extends therethrough to move between the first position shown in FIG. 2 and second position illustrated in FIG. 1.

Two spaced openings 104 are formed in the wall 92 adjacent the edge 98, and screws 106 extend therethrough, which screws also extend through the openings 28 to engage two of the bosses 46 to maintain the first and second housing portions D-1 and D-2 and the plate assembly D together as an integral unit, as shown in FIGS. 1, 2 and 3. When the plate assembly D is mounted on the housing portion D-1, the flange 102 is in interlocking relationship with the rub 24 formed on the first side wall 10 and extends partially along the upper edge thereof, the rear edge 16, and forwardly along the lower edge 14, as shown in FIG. 8. The forwardly disposed boss 46 that extends outwardly from the second housing portion D-2 is in alignment with an opening 28 formed in the forward portion of the housing portion D-1 and is engaged by a screw 108 that extends through both the openings 28 to engage the tapped interior of the boss 46.

In FIG. 8 it will be seen that a wire spring 110 is provided that is in the form of a V, and includes a first leg 110a, a second leg 110b, with these legs at the apex thereof developing into a loop 110c. The loop 110c, as shown in FIG. 4, encircles the bearing 56, with the first leg 110a on the outer extremity thereof being in engagement with a pin 112 that extends outwardly from the arm 54, as shown in FIG. 4. The second leg 110b (FIG. 4) engages the flange portion 102 that extends from the lower edge 96 of the plate assembly G.

The use and operation of the invention is extremely simple. The tape C is withdrawn at least partially from the housing D in which it is disposed, with the stop C-2 being held with one hand at a stationary position relative to the article or material (not shown) that is to be measured, whereby the invention A is then moved away from the stationary position C-2 of the tape. When the tape C is aligned with that portion of the article or material to be measured, the arm 54 is pivoted from the second position shown in FIG. 1 to that shown in FIG. 2 to bring the arrow 54 in alignment with the appropriate graduation C-1 on the tape. The button 86 is then moved downwardly to force the marking tip 78 outwardly through the resilient leaves 70 into contact with the article to be measured. The mark made by the tip 78 is placed on the article in transverse alignment with the arrow 59, and therefore accuracy in measuring the article or material is attained. When the measurement is completed, the arm 54 is released, with the spring 110 then pivoting the arm and the marking assembly F upwardly from the first to the second position shown in FIG. 1. When the arm 54 is so released, the spring 82 moves the tip 78 upwardly into the confines of the leaves 70, whereby the article or material being measured will not be inadvertently contacted by the mark-applying tip 78.

If the spool B is spring-loaded, the tape C will automatically be retracted into the confines of the housing D defined by the first and second portions D-1 and D-2, with the stop C-2 preventing the free end of the tape from passing through the slit 30 into the confines of the housing. The invention A above-described is of such structure that it is ideally suited to have the major portions of the components thereof injection molded from a suitable polymerized resin such as polypropylene or polycarbonate.

The use and operation of the invention has been previously described in detail and need not be repeated.

We claim:

1. A tape measure of the type that includes a housing having first and second side walls and an end wall in which a transverse slit is defined, a spool rotatably supported in said housing on which an elongate tape having measuring graduations thereon is wound, said tape extending through said slit, and on a free end of which a stop is mounted to prevent said tape from being completely retracted into said housing, and means for rotating said spool in a direction to retract said tape into said housing, the improvement of a marking device on said tape measure wherein:
    a. an arm pivotally supported on said side wall and parallel thereto, said arm having a first free portion, and a transverse pointer forming a part of said free end portion;
    b. spring means that at all times tend to pivot said arm from a first downward position to a second upward position;
    c. a first tube having first and second open ends, said tube being mounted on said first end portion of said arm and substantially normal relative to the longitudinal axis of said arm;
    d. a marking quill assembly that includes a cylindrical body having first and second ends, an elongate marking tip extending from said first end of said body, and an outwardly extending cylindrical collar on said cylindrical body adjacent said second end thereof;
    e. a second tube that occupies a fixed position in said first tube, said second tube having a first open end and a resilient slit, closed second end portion that projects outwardly through said first end of said first tube, and a transverse body shoulder inside said second tube intermediate said first open end and second closed end thereof;
    f. a compressed helical spring disposed in said tube that encircles said marking quill assembly and has one end in contact with said collar and the other end in engagement with said body shoulder;
    g. an elongate button slidably movable in said second tube adjacent said first end thereof and projecting outwardly therefrom; and
    h. stop means that prevent said helical spring from moving said button outwardly from said second tube, with said device when said arm is pivoted to said first position with said pointer transversely aligned with a desired graduation on said tape, permitting a mark to be made that is transversely aligned with said desired graduation when said button is forced downwardly to move said marking tip longitudinally through said second end portion of said second tube to contact a surface on which said mark is desired to be made.

2. A device as defined in claim 1 which further includes:
    i. a flanged plate disposed adjacent said first side of said housing and cooperating with said housing to define an elongate slot through which said arm extends, said slot being of sufficient length as to permit said arm to move between first and second positions; and
    j. means for removably securing said flanged plate to said housing, with said flanged plate concealing the major portion of said arm.

3. A device as defined in claim 2 wherein said arm has a transverse bearing adjacent said second end thereof, which device further includes:
    k. a stub shaft that extends outwardly from said first side of said housing and through said transverse bearing in said arm, said arm being pivotally supported on said stub shaft.

4. A device as defined in claim 3 wherein said spring means is a resilient wire in the shape of a "V" having first and second legs and a closed circular loop at an apex of said first and second legs, said loop extending around said bearing, with said first leg engaging a portion of said arm and said second leg engaging a portion of said flanged plate.

5. A device as defined in claim 1 wherein said button includes a circumferentially extending body shoulder, and said stop means are lugs that project inwardly from said second tube and engage said body shoulder.

* * * * *